United States Patent [19]

Suzuki et al.

[11] Patent Number: 4,499,979
[45] Date of Patent: Feb. 19, 1985

[54] LOCK-UP CONTROL SYSTEM FOR LOCK-UP TORQUE CONVERTER FOR LOCK-UP TYPE AUTOMATIC TRANSMISSION

[75] Inventors: Tadashi Suzuki; Yoshiro Morimoto; Hideo Hamada, all of Yokosuka; Masaaki Suga, Yokohama; Masaaki Futagi, Yokosuka, all of Japan

[73] Assignee: Nissan Motor Company, Limited, Yokohama, Japan

[21] Appl. No.: 308,595

[22] Filed: Oct. 5, 1981

[30] Foreign Application Priority Data

Oct. 6, 1980 [JP] Japan ................................. 55-138668

[51] Int. Cl.³ .............................................. B60K 41/22
[52] U.S. Cl. .................................... 192/3.31; 192/3.58
[58] Field of Search .............. 192/0.033, 0.052, 0.073, 192/0.076, 3.31, 3.58, 103 R; 74/866; 361/239, 240

[56] References Cited

U.S. PATENT DOCUMENTS

| 3,448,640 | 6/1969 | Nelson | 74/866 |
|---|---|---|---|
| 3,805,640 | 4/1974 | Schneider et al. | 74/866 |
| 4,038,889 | 8/1977 | Lindow et al. | 74/866 |
| 4,056,177 | 11/1977 | Ahlen et al. | 192/3.31 |
| 4,208,929 | 6/1980 | Heino et al. | 74/866 |
| 4,270,636 | 6/1981 | Sunohara et al. | 192/3.31 |
| 4,271,939 | 6/1981 | Iwanaga et al. | 192/3.3 |
| 4,294,140 | 10/1981 | Iwanaga et al. | 192/3.31 |
| 4,338,666 | 7/1982 | Suzuki et al. | 74/866 |
| 4,338,832 | 7/1982 | Pelligrino | 74/866 |
| 4,350,234 | 9/1982 | Suga et al. | 74/866 |
| 4,369,865 | 1/1983 | Sunohara et al. | 192/3.31 |

FOREIGN PATENT DOCUMENTS

| 2345010 | 3/1974 | Fed. Rep. of Germany . |
| 2375508 | 7/1978 | France . |
| 1536657 | 12/1978 | United Kingdom . |
| 2030661 | 4/1980 | United Kingdom . |

Primary Examiner—George H. Krizmanich
Attorney, Agent, or Firm—Schwartz, Jeffery, Schwaab, Mack, Blumenthal & Koch

[57] ABSTRACT

The lock-up control system stores lock-up speed values for each gear position of the transmission. These values are compared against actual vehicle speed to control lock-up of the transmission. In the system, a counter receives clock pulses from a clock and sensor pulses from a vehicle speed sensor. The sensor pulses have a frequency indicative of information related to vehicle speed. The counter counts sensor pulses within a time interval between two adjacent clock pulses. This count is therefore indicative of vehicle speed.

7 Claims, 5 Drawing Figures

LOCK-UP CONTROL SYSTEM FOR LOCK-UP TORQUE CONVERTER FOR LOCK-UP TYPE AUTOMATIC TRANSMISSION

BACKGROUND OF THE INVENTION

1. Field of the Invention

The present invention relates to a lock-up control system for a lock-up torque converter for a lock-up type automatic transmission.

2. Description of the Prior Art

Commonly, automatic transmissions have a torque converter in a power transmitting system not only to absorb the variation in torque generated by an engine, but also to multiply the engine torque. The ordinary torque converter operates such that an input element (turbine runner) rotates a working fluid inside the converter and the rotation of the working fluid rotates an output element (turbine runner) under the reaction of a stator by multiplying the torque (a converter state). Thus, since the input and output elements of the torque converter are not mechanically connected with each other, a slip between the input and output elements is unavoidable when it is in operation, causing the automatic transmission having the torque converter to operate with poor power transmission efficiency although it is easy to operate. Therefore, it has been proposed to provide a lock-up type automatic transmission that has a lock-up torque converter which locks up via the engagement of a lock-up clutch (lock-up state) when a vehicle speed is higher than a predetermined value (often called a lock-up vehicle speed value) in at least one gear position because in this circumstance the multiplication of the engine torque by the torque converter is not required and the variation in the engine torque is so small as to create no problem.

SUMMARY OF THE INVENTION

It is an object of the present invention to provide a lock-up control system which receives digital outputs generated by sensors and/or switches and processes them as they are in digital form.

According to the present invention, predetermined lock-up vehicle speed values are stored versus at least gear positions selectable by an automatic transmission, a sensor generates sensor pulses having a frequency indicative of an information related to a vehicle speed, a clock generates clock pulses having a predetermined interval, means is responsive to one of the sensor pulses generated by the sensor and the clock pulses generated by the clock for counting the other pulses and generates a vehicle speed signal indicative of the vehicle speed. Based on this vehicle speed signal and a lock-up vehicle speed value found versus a gear position selected by the automatic transmission, an arithmetic operation is performed to generate a lock-up command signal when the vehicle speed signal has a predetermined relationship with the lock-up vehicle speed value.

DESCRIPTION OF THE EMBODIMENTS

Figure 3:
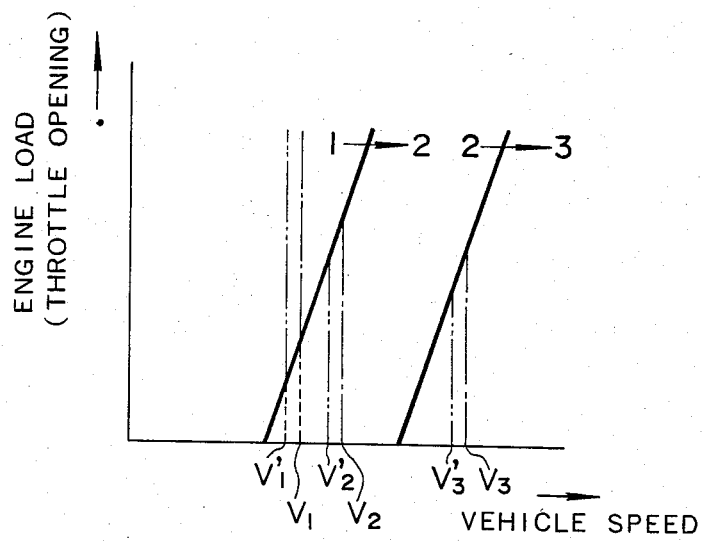
FIG. 3 is a shift pattern diagram illustrating lock-up ranges.

Referring to the accompanying drawings, and more particularly to FIG. 3, a lock-up shift pattern of a three-speed automatic transmission is illustrated where $V_1$, $V_2$, $V_3$ denote lock-up vehicle speed values for the first gear position, second gear position and third gear position, respectively, and $V_1'$, $V_2'$, $V_3'$ denote lock-up release vehicle speed values for the first gear position, second gear position and third gear position, respectively, which are set at relatively low vehicle speed values to provide hysteresis.

Figure 1:
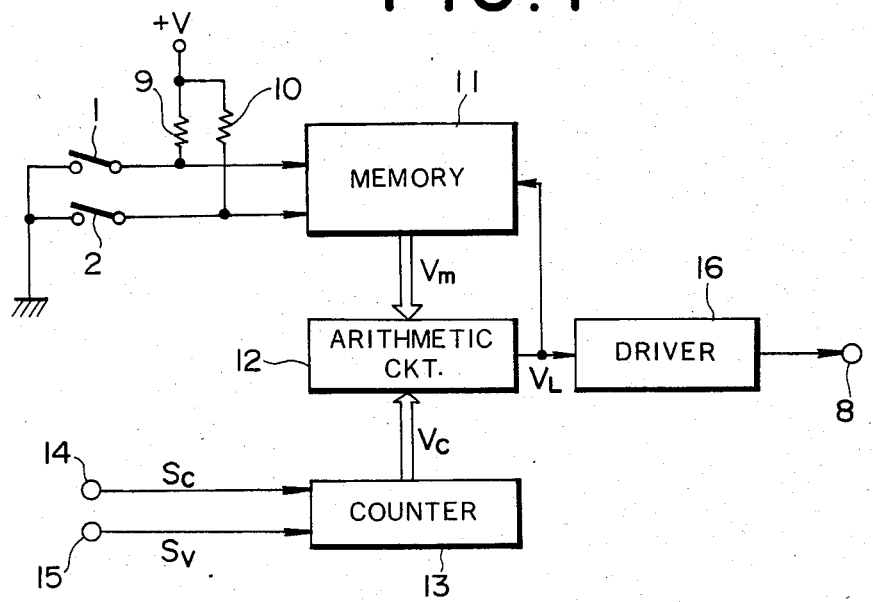
FIG. 1 is a block diagram of a first embodiment of a lock-up control system according to the present invention.

The lock-up control is effected in response to a lock-up command signal generated by a lock-up control system as shown in FIG. 1. Whenever the vehicle speed exceeds one of the lock-up vehicle speed values $V_1$, $V_2$, $V_3$, which corresponds to a selected one of the gear positions, a lock-up solenoid valve 8 is energized to cause the torque converter to lock up. Whenever the vehicle speed drops below the above-mentioned one of the lock-up release vehicle speed values $V_1'$, $V_2'$, $V_3'$, the lock-up solenoid valve 8 is not energized to release the lock-up of the torque converter.

Referring to FIG. 1, the first embodiment is described wherein designated by 1 is a 1-2 shift switch, and designated by 2 is a 2-3 shift switch. Switches 1 and 2 are mounted within a 1-2 shift valve and a 2-3 shift valve and operable such that when the spools of the shift valves are in the downshift positions, they are closed, while, when in the upshift positions, they are opened. Therefore, both of the shift switches 1 and 2 show an open and closed combination for each of the gear positions as shown in the following TABLE 1.

TABLE 1

| Gear position | Shift switch | |
|---|---|---|
| | 1-2 shift switch 1 | 2-3 shift switch 2 |
| First gear | Close | Close |
| Second gear | Open | Close |
| Third gear | Open | Open |

For fully understanding the structure of the lock-up solenoid valve 8, the lock-up torque converter, the 1-2 shift switch 1 and 2-3 shift switch 2, reference is made to the copending Patent Application Serial No. 247,906, SUGA et al., entitle "LOCK-UP CONTROL SYSTEM FOR LOCK-UP TYPE AUTOMATIC TRANSMISSION" filed on Mar. 26, 1981 which is incorporated herein by reference.

The 1-2 shift switch 1 and 2-3 shift switch 2 are connected with a power supply +V via resistors 9, 10. Thus, the shift signal $S_{12}$ generated by the 1-2 shift switch 1 goes to a L level when the corresponding switch is closed or goes to a H level by the power supply +V when the corresponding switch is opened, and the 1-2 shift signal generated by the 2-3 shift switch 2 goes to a L level when the switch is closed and goes to a H level by the power supply when the switch is opened. Hence, both of the shift signals $S_{12}$, $S_{23}$ present combinations of levels in response to gear positions as shown in the following TABLE.

TABLE 2

| Gear position | Shift signal | |
|---|---|---|
| | $S_{12}$ | $S_{23}$ |
| First gear | L | L |
| Second gear | H | L |
| Third gear | H | H |

The shift signals $S_{12}$, $S_{23}$ are fed to a set vehicle speed memory circuit 11 (including a ROM) where, in accordance with the combinations in levels of the shift signals $S_{12}$, $S_{23}$ as shown in the above TABLE 2, a current gear position selected by the transmission is determined and an addressing operation is performed in response to the current gear position of the predetermined lock-up and release vehicle speed values $V_1$, $V_1'$, $V_2$, $V_2'$, $V_3$, $V_3'$ which are stored and an addressed lock-up vehicle speed value signal $V_m$ is generated and sent to an arithmetic circuit 12.

TABLE 3

| Gear position | Address Signal | | | Set vehicle speed |
|---|---|---|---|---|
| | Shift signal $S_{12}$ | Shift signal $S_{23}$ | Lock-up signal $V_L$ | |
| First Gear | L | L | L(converter) | $V_1$ |
| | | | H(lock-up) | $V_1'$ |
| Second gear | H | L | L(converter) | $V_2$ |
| | | | H(lock-up) | $V_2'$ |
| Third gear | H | H | L(converter) | $V_3$ |
| | | | H(lock-up) | $V_3'$ |

As is clear from the TABLE 3, the addressed values differ in response to a lock-up signal $V_L$ since the lock-up signal $V_L$ generated by the arithmetic circuit 12 is fed back to the set vehicle speed memory circuit 11 such that, as will be understood from the following description, when the lock-up signal $V_L$ is a L level indicating the converter state, the set vehicle speed value $V_1$ or $V_2$ or $V_3$ is addressed in response to the gear position, while, when the lock-up signal $V_L$ is a H level, the set vehicle speed value $V_1'$ or $V_2'$ or $V_3'$ is addressed in response to the gear position.

Designated by 13 is a 2-bit counter which receives clock pulses $S_c$ generated by a clock 14 and sensor pulses $S_v$ generated by a vehicle speed sensor 15 and counts the clock pulses $S_c$ within a time interval between the adjacent two sensor pulses $S_v$. The counter 13 generates an output signal $V_c$ indicative of the total count within the time interval. The content of the counter 13 is cleared by the sensor pulse $S_v$ by the vehicle speed sensor 15. For ease of reference, the output signal $V_c$ is called a vehicle speed signal.

The arithmetic circuit 12 receives an output signal $V_m$ generated by the memory 11 and the vehicle speed signal $V_c$. The output signal $V_m$ is indicative of a selected lock-up or release vehicle speed value found versus a current gear position and the state of the lock-up signal $V_L$. The arithmetic circuit 12 generates a H level signal (a lock-up signal $V_L$) when $V_c - V_m \geq 0$ or a L level signal (lock-up release signal) when $V_c - V_m < 0$. The output signal $V_L$ is fed to the driver 16 by which the solenoid 8 for the lock-up control valve is energized to cause the torque converter to lock-up when the $V_c$ is higher than or equal to $V_m$ and the lock-up solenoid 8 is not energized when the $V_c$ is lower than $V_m$ to release the lock-up of the torque converter. In order to provide hysteisis between the lock-up and the lock-up release, the output of the arithmetic circuit 12 is fed to the memory 11. The output $V_m$ of the memory switches from values indicative of the set of lock-up vehicle speed values $V_1$, $V_2$ and $V_3$ to the set of lock-up release vehicle speed values $V_1'$, $V_2'$, and $V_3'$ when the output $V_L$ changes from a L level to a H level.

Although, in the preceding embodiment, the clock pulses $S_c$ generated by the clock 14 are counted within the time interval between the adjacent two sensor pulses $S_v$ generated by the vehicle speed sensor 15, the counter 13 may count the sensor pulses $S_v$ generated by the vehicle speed sensor 15 within a predetermined time interval between the adjacent two clock pulses $S_c$ generated by the clock 14. It is needless to say that a microcomputer may be used to determine the vehicle speed and to compare the vehicle speed with a lock-up or lock-up release value stored in a ROM.

Figure 2:
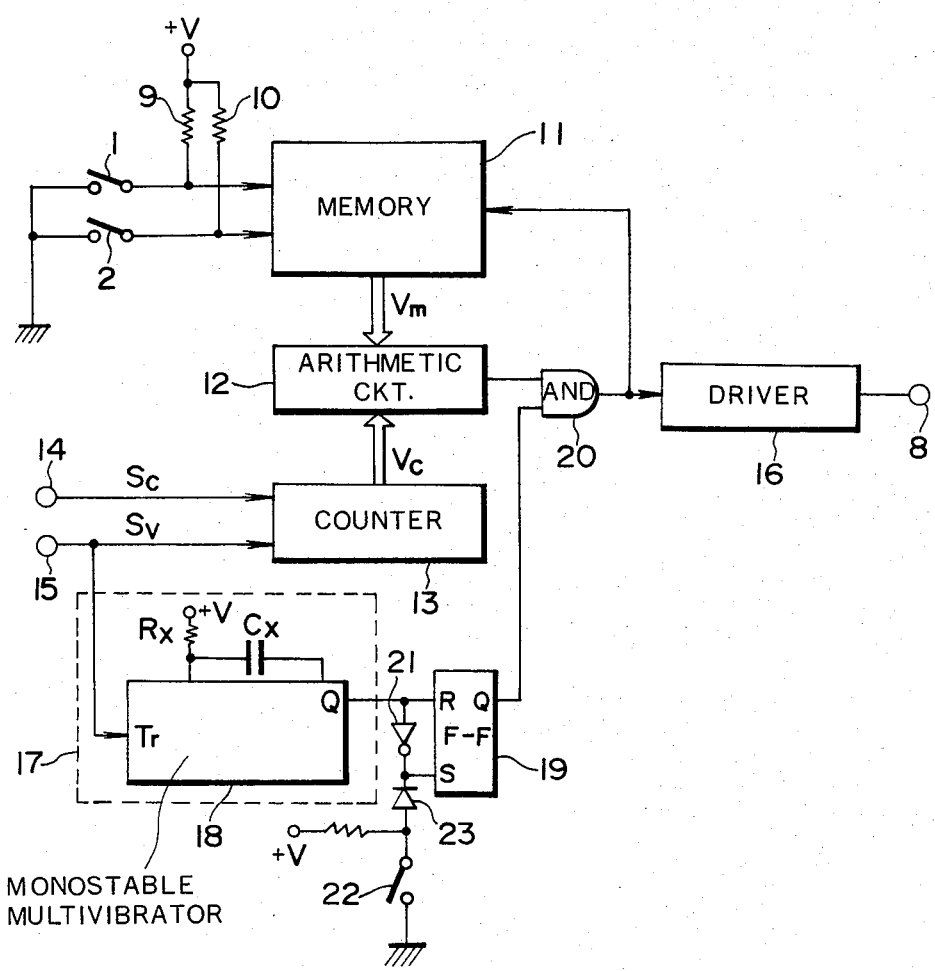
FIG. 2 is a block diagram of a second embodiment of a lock-up control system according to the present invention.

Referring to FIG. 2, a second embodiment is described. This embodiment is different from the first embodiment illustrated in FIG. 1 in the provision of a means responsive to an abnormal frequency state of the sensor pulses $S_v$ of the vehicle speed sensor 15 for leaving the lock-up solenoid valve 8 in a state to release the lock-up of the torque converter. This means comprises an abnormal frequency state detecting circuit 17 which includes a monostable multivibrator 18 which is triggered by the sensor pulses $S_v$, a resistor $R_x$ and a capacitor $C_x$. The monostable multivibrator 18 has a trigger terminal Tr receiving sensor pulses $S_v$ from the vehicle speed sensor 15 and generates, in synchronous with a rising edge of each of the sensor pulses $S_v$, a monostable pulse from an output terminal Q thereof which pulse has a pulse width determined by the resistor Rx and capacitor Cx. The monostable multivibrator 18 is triggered whenever it receives a rising edge of the pulses $S_v$ within a time interval of the pulse width of the monostable pulse, thereby maintaining its output level at a H level, but if it does not receive a rise edge of the subsequent pulse $S_v$ within the pulse width time of the monostable pulse, the output on the output terminal Q is switched to a L level.

In the circumstance that a H level signal is generated by the output terminal Q of the monostable multivibrator 18 when the vehicle speed spensor 15 operates normally, since this H level signal resets a flip flop 19 and thus the flip flop 19 keeps generating a H level signal from the output terminal $\overline{Q}$ thereof and feeds same to one of the input terminals of an AND gate 20, the lock-up control as mentioned above is carried out in response to the lock-up signal $V_L$ supplied to the other input terminal of the AND gate 20. If the signal level of the output terminal Q of the monostable multivibrator 18 is switched to a L level when the vehicle speed sensor 15 is out of order and not able to generate sensor pulses $S_v$ normally, since this L level signal is fed after having been inverted by a NOT gate into a H level to a set terminal S of the flip flop 19 and thus this flip flop 19 is set to feed a L level signal to the AND gate 20 from an output terminal $\overline{Q}$ thereof, the lock-up solenoid valve 8 is kept deenergized to release the lock-up of the torque converter so as to leave the torque converter to operate in the converter state irrespective of the level of the lock-up signal $V_L$, thus preventing the occurrence of engine stall.

The above mentioned set state of the flip flop 19 takes place when a H level signal is fed to a set terminal S after the ignition switch 22 is opened. Therefore, under this circumstance, if the engine is started after the ignition switch 22 has been closed again, the system according to the present invention is able to effect the lock-up control, but, if the vehicle speed sensor 15 is still out of order to cause the monostable multivibrator 18 to issue a L level signal from the output terminal Q right after a H level signal has been issued, the converter state is kept, thus preventing the engine from stalling, thus permitting the vehicle to keep operating normally.

In the preceding embodiments, the actual vehicle speed has been detected via pulses having a frequency indicative of the vehicle speed. The vehicle speed may also be detected by an engine revolution speed sensor which generates pulses having a frequency indicative of the engine revolution speed. In this case, too, a disorder of the engine revolution speed sensor may be detected in the same manner as described in connection with the FIG. 2 embodiment. In this embodiment, the engine stall which might otherwise occur after the wheel has been locked upon rapid braking is prevented.

Since, in the embodiment shown in FIG. 1 or 2, the lock-up control valve shifts to cause the converter to operate in a converter state when the vehicle speed signal $S_v$ shows an abnormal value if the sensor 15 is out of order, a wire has broken or short circuited, any inconvenience resulting from the vehicle continuing to run with annoying vibration of the engine is eliminated.

Figure 4:
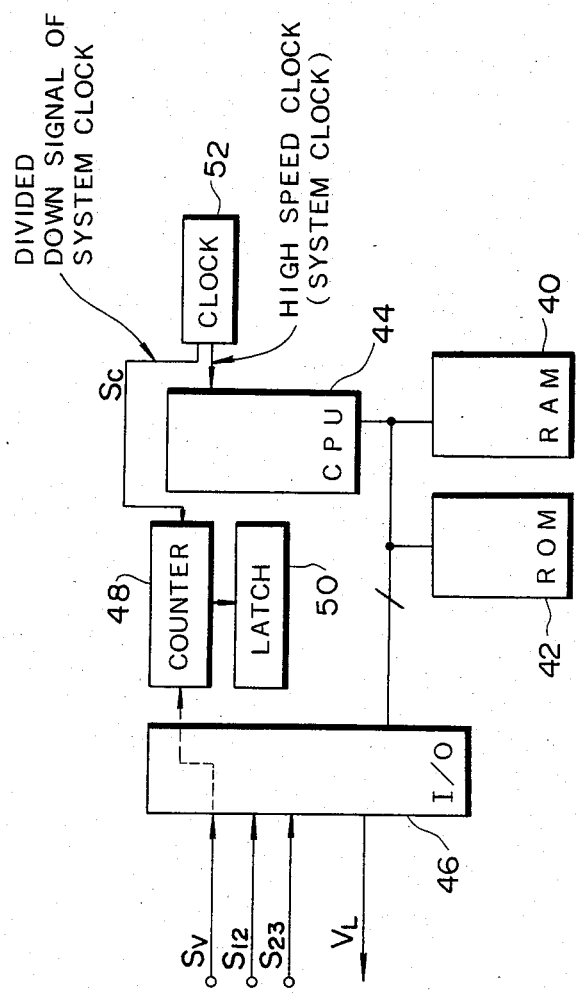
FIG. 4 is a block diagram using a microcomputer of a lock-up control system according to the present invention.

The control laws employed by the control system shown in FIG. 1 may be carried out by a system using a microcomputer as shown in FIG. 4.

FIG. 4 shows the microcomputer which includes usual components, such as RAM 40, ROM 42, CPU 44, I/O interface 46, a counter 48, a latch 50, a clock 52, etc.

Figure 5:
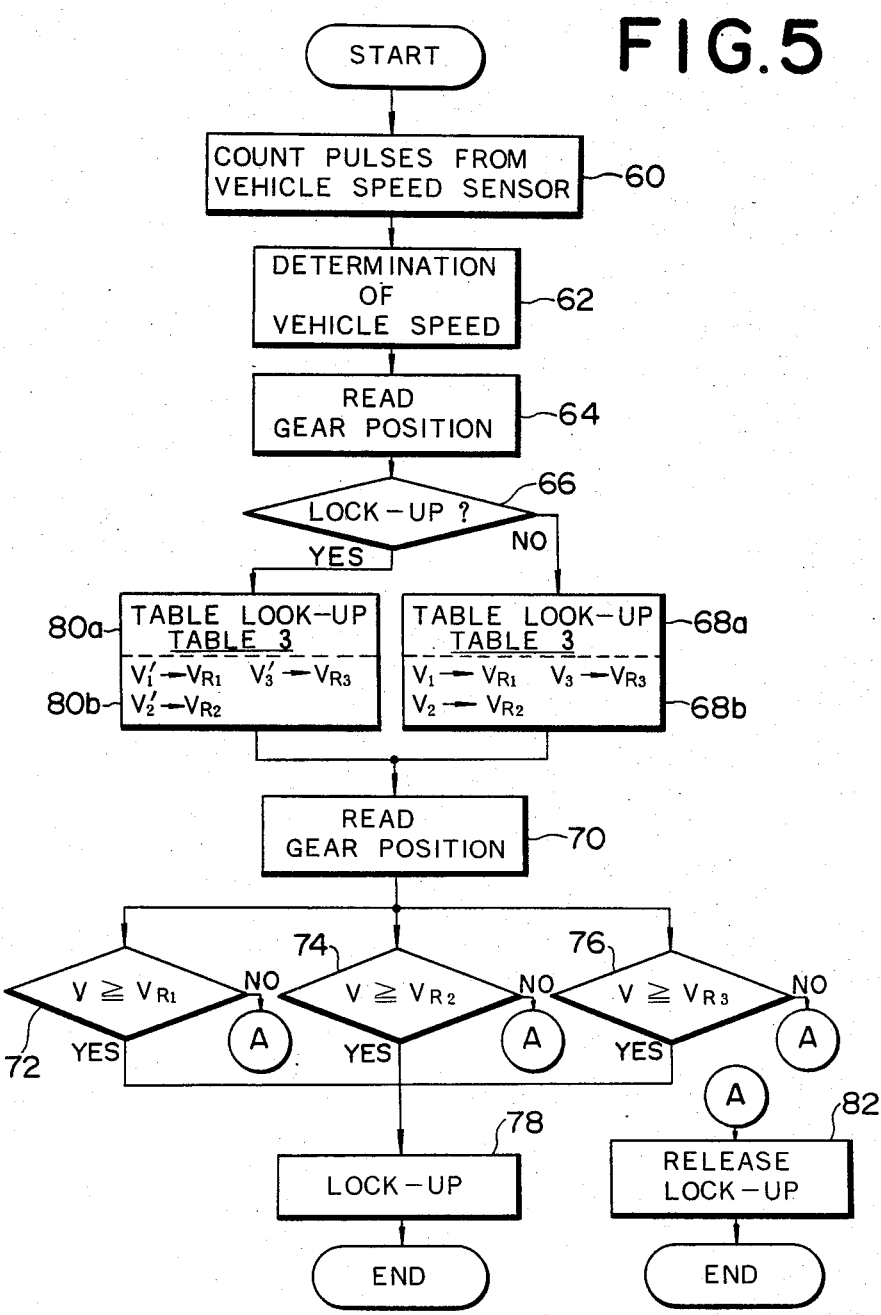
FIG. 5 is a flow diagram for the system shown in FIG. 4.

FIG. 5 is a flow diagram implementing the embodiment shown in FIG. 1.

Referring to FIG. 5, in a step 60, clock pulses $S_c$ generated by the clock 52 (see FIG. 4) are counted by the counter 48 within a time interval between the adjacent two sensor pulses $S_v$ generated by a vehicle speed sensor 15 and the total count is stored in the latch 50. The control goes to a step 62 where the content of the latch 50 is read to determine the current vehicle speed and the control goes to a step 64 where a current gear position is read based on the inputs $S_{12}$ and $S_{23}$. Thereafter, the control goes to a step 66 where a decision is made whether the torque converter locks up or not by monitoring the signal level of the output $V_L$. If the answer to the question in the decision step 66 is NO, the control goes to a step 68 where a table look-up of TABLE 3 is carried out and the set of lock-up vehicle speed values $V_1$, $V_2$ and $V_3$ are addressed to buffers $V_{R1}$, $V_{R2}$ and $V_{R3}$, respectively. Thereafter, the control goes to a step 70 where the gear position is read. If the first gear position is read in the step 70, the control goes to a step 72, if the second gear position is read in the step 70, the control goes to a step 74, and if the third gear position is read in the step 70, the control goes to a step 76. In each of the steps 72, 74 and 76, the vehicle speed value v is compared with the value stored in $V_{R1}$ or $V_{R2}$ or $V_{R3}$. If the answer to this question in the step 72 or 74 or 76 is YES, the control goes to a step 78 where the lock-up signal is generated to cause the torque converter to lock up. If the answer to this question is NO, the control goes to a step 82 where the lock-up of the torque converter is released.

Assuming that the torque converter is in the lock-up state, the answer to the question in the step 66 is YES and the control goes to a step 80 where the values of the buffers $V_{R1}$, $V_{R2}$ and $V_{R3}$ are replaced with the lock-up release values $V_1'$, $V_2'$ and $V_3'$, respectively.

What is claimed is:

1. A lock-up control system for a lock-up torque converter for a lock-up type automatic transmission for an automotive vehicle having an engine, the automatic transmission having at least two gear positions and having a lock-up control valve which is operable to cause the lock-up torque converter to lock up, said lock-up control system comprising:
    means for generating a gear position signal indicative of one of the gear positions selected by the automatic transmission;
    means for storing predetermined lock-up vehicle speed values versus at least the gear positions and for generating a signal indicative of a lock-up vehicle speed value versus the one gear position indicated by said gear position signal;
    sensor means for generating sensor pulses having a frequency indicative of information related to the vehicle speed of the automotive vehicle;
    clock means for generating clock pulses having a predetermined interval;
    means responsive to one of said sensor pulses and said clock pulses for counting the other within a time interval between two adjacent pulses of said one pulses and for generating a vehicle speed signal indicative of the vehicle speed;
    means for receiving said signal indicative of the lock-up vehicle speed value and said vehicle speed signal and for generating a lock-up signal when said vehicle speed signal has a predetermined relationship with said signal indicative of the said lock-up vehicle speed value; and
    drive means for operating the lock-up control valve responsive to said lock-up command signal to cause the torque converter to lock up.

2. A lock-up control system as claimed in claim 1, wherein said storing means stores predetermined lock-up release vehicle speed values versus at least the gear positions, said storing means being responsive to said lock-up command signal also.

3. A control system as claimed in claim 1 or 2, including a microcomputer responsive at least to said gear position signal, said sensor pulses and said clock pulses, said microcomputer generating said lock-up command signal.

4. A control system as claimed in claim 1 or 2, including means for leaving the lock-up valve in a state to release the lock-up of the torque converter in response to a predetermined abnormal state of said sensor means.

5. A control system according to claim 1, wherein said storing means stores a different lock-up speed for each gear position.

6. A control system according to claim 1, wherein said counting means counts the number of said sensor pulses within a time interval between two adjacent pulses of said clock pulses.

7. A control system according to claim 1, further comprising:
    a monostable multivibrator having a trigger terminal coupled to said sensor means to be triggered by said sensor pulses and having an output terminal; and flip flop circuit means coupled to said output terminal of said monostable multivibrator for generating a signal indicative of a predetermined abnormal state of the sensor pulses.

* * * * *